Feb. 1, 1966   TAKAO YAMAGUCHI ETAL   3,233,171
APPARATUS FOR DETECTING THE PRESENCE, MAGNITUDE AND DIRECTION
OF MAGNETIC FIELDS UTILIZING SATURABLE MAGNETIC CORE
ENERGIZED BY ALTERNATING CURRENT
Filed Sept. 13, 1961

Takao Yamaguchi
Shigetoshi Matsuno
Shuichi Koga
INVENTORS

BY
Pierce, Scheffler & Parker
Attorneys

United States Patent Office 3,233,171
Patented Feb. 1, 1966

3,233,171
APPARATUS FOR DETECTING THE PRESENCE, MAGNITUDE AND DIRECTION OF MAGNETIC FIELDS UTILIZING SATURABLE MAGNETIC CORE ENERGIZED BY ALTERNATING CURRENT
Takao Yamaguchi, Tokyo, Shigetoshi Matsuno, Todukaku, Yokohama, and Shuichi Koga, Tokyo, Japan, assignors to Tokyo Keiki Seizosho Company, Ltd., Tokyo, Japan, a corporation of Japan
Filed Sept. 13, 1961, Ser. No. 137,817
Claims priority, application Japan, Sept. 21, 1960, 35/38,599
4 Claims. (Cl. 324—47)

This invention relates to electrical apparatus and more particularly to an improved construction for a device for detecting the presence of magnetic fields and especially those of relatively small magnitude.

A principal object of the invention is to provide an improved electro-magnetic apparatus which is capable of detecting in a most accurate manner the presence of a D.C. magnetic field of comparatively small magnitude, and especially a micro D.C. magnetic flux such as the earth's magnetic field.

Heretofore, major difficulties in measurement of the earth's magnetic field have been experienced in the elimination of zero-drift due to those factors as temperature change, residual magnetism, composition of materials and fluctuation of supply voltage. This invention has for its object the provision of an apparatus which is free from such difficulties and which is simple, lightweight and economical in its construction and capable of accurate measurement of micro D.C. flux.

The foregoing objects and advantages will become more clearly understood from the following detailed description of a preferred embodiment of the invention and from the accompanying drawings wherein.

Figure 1:
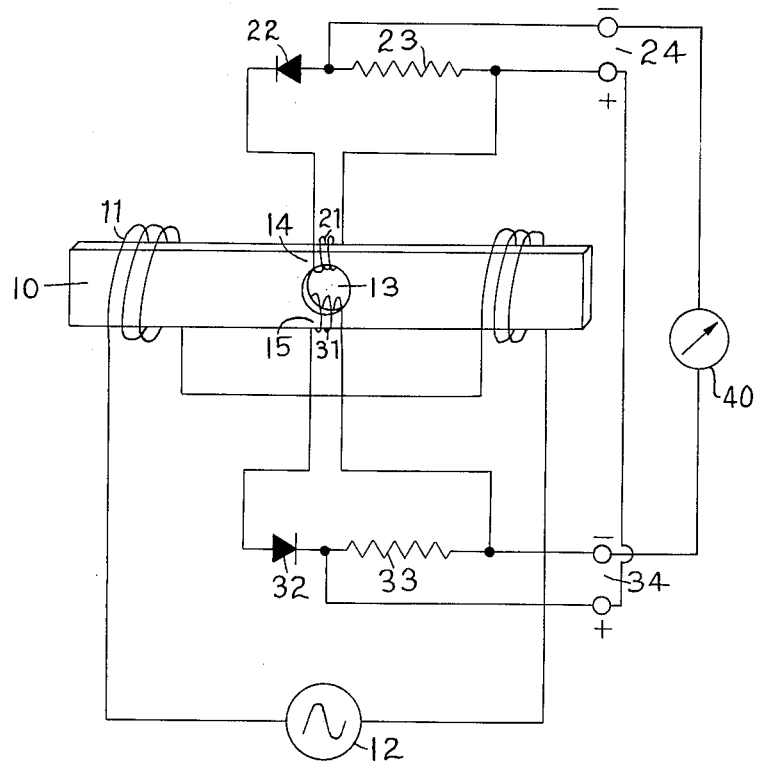
FIG. 1 is a combined mechanical and electrical schematic view of the improved magnetic field detecting apparatus.

With reference now to the drawings, the magnetic field detecting apparatus comprises a saturable magnetic core 10 having the configuration of an elongated bar of rectangular cross-section which is comparatively wide as compared with its thickness. At the left and right sides of the magnetic core, primary windings 11 are wound around the core, and these windings are excited by means of an alternating current (A.C.) supply 12. Frequency of the (A.C.) supply may be of any value, although higher frequencies are desirable because they allow a reduction in dimensions of the apparatus. Ferrite cores are most desirable as the materials of the magnetic core 10.

An opening 13 is located at the center of the magnetic core 10. Consequently, two narrow magnetic paths 14 and 15 exist above and under the opening 13. The term "saturation of the magnetic core" as used in this specification applies to the magnetic saturation at these parts, i.e., the magnetic paths 14 and 15. A pair of secondary windings 21 and 31 are wound around the magnetic paths 14 and 15, respectively. A rectifier 22 and a resistance 23 are connected to one of the secondary windings 21 while a similar rectifier 32 and a resistance 33 are connected to the other secondary winding 31. Opposite ends of the resistances 23 and 33 are connected to the output terminals 24 and 34 respectively. Directions of current conduction of the rectifiers 22 and 32 are so selected that the magnetic fluxes generated by the rectified current of the secondary windings 21 and 31 turn around the opening 13 in the same direction, as explained hereinafter. 40 is a voltmeter suitably connected between the terminals 24 and 34 for detecting the difference between the induced D.C. voltages in the secondary windings 21 and 31.

When an alternating current is supplied to the primary windings 11, the magnetic paths 14 and 15 are given therethrough two identical fluxes which in turn induce corresponding alternating electromotive forces in the secondary windings 21 and 31, but the rectifiers 22 and 32 cause currents in each of the secondary windings to flow in one direction only. The directions of the magnetic fluxes caused by the secondary currents are selected so that the fluxes turn round the opening 13 in the same direction, e.g. clockwise as indicated by two arrows 16 and 17 in FIGURE 2. It follows that, in addition to the alternating flux produced by the primary windings 11, a pair of D.C. magnetic fields exist in the magnetic paths 14 and 15, the directions of which are opposite to each other.

Now, assuming that there is no D.C. magnetic field in the longitudinal direction of the core 10, the magnetomotive forces in the magnetic paths 14 and 15 swing to left and right of the zero point by the current in the primary windings 11. Consequently, the rectified currents in the secondary circuits are equal to each other, and two voltages which appear at the terminals 24 and 34 are also equal. The magnetomotive force caused by the primary current is adjusted so that the magnetic paths 14 and 15 are excited up to near the saturation point.

Figure 2:
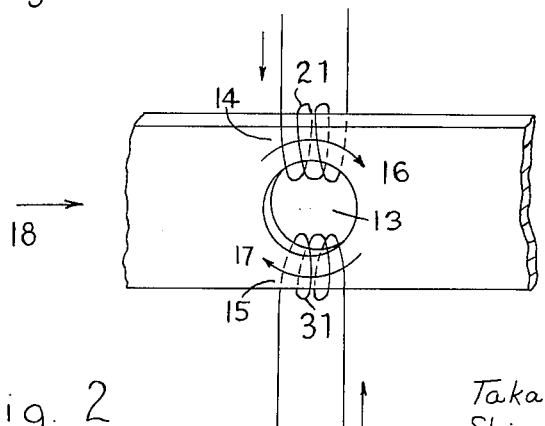
FIG. 2 is an enlarged view of a portion of the apparatus illustrated in FIG. 1 in order to show further details of the operating principles involved.

When a certain amount of D.C. magnetic field exists along the longitudinal direction of the magnetic core 10 such as that indicated by the arrow 18 in FIGURE 2, the magnetic field 18 is added to the magnetic field 16 and subtracted from the magnetic field 17. Then the magnetomotive forces produced in the magnetic paths 14 and 15 have their centers deviated from the zero point to either side as much as the amount of the magnetic field 18, and swing to left and right of the centers by the same amount as they are influenced by the primary current. Consequently, the magnetic paths reach the saturation point earlier when excitations caused by the A.C. primary current swing to the same direction as that of the D.C. magnetic field 18, while they reach the saturation point later, or they do not reach the saturation point at all, when the excitations caused by the primary current swing to the opposite direction.

Although the alternating excitations as described above produce alternating electromotive forces in the secondary windings 21 and 31, the rectifiers 22 and 32 function to allow currents to flow only in one direction in each of the secondary windings. The direction of flow of the currents are such that as shown in FIG. 2, the directions of the magnetic fluxes caused by the currents turn round the opening 13 in one direction as indicated by two arrows 16 and 17. As it is, the magnetic field produced by the secondary current causes the D.C. magnetic field in the magnetic path 14 to increase in addition to the given D.C. magnetic field 18, while it causes the D.C. magnetic field in the magnetic path 15 to decrease in subtraction of the magnetic field 18. Now, if these magnetic fields are considered as a whole, including the one that is produced by the primary current, the magnetic field in the magnetic path 14 is given a bias which is greater than that given by the D.C. magnetic field 18 only, while the magnetic field in the magnetic path 15 is given a bias which is smaller than that given by the field 18, and they both swing to left and right by the same amount. Now, both magnetic paths 14, 15 are saturated when supplied with magnetic fields stronger than the magnetic field due to the primary current. Therefore, when the resultant magnetic field swings in the direction in which the bias is given, the magnetic paths will be saturated before the field reaches its maximum value, and after saturation the magnetic flux will not further be increased in any significant amount. And, since the bias in path 14 is greater than that in path 15, the time during which the flux in path 14 is saturated is longer than the corresponding time for path 15. Therefore, the voltage induced in the secondary winding 31, when considered as a whole, is somewhat larger than that induced in the secondary winding 21, so that the D.C. voltage output at the terminal 34 is larger than that at the terminal 24.

In cases where direction of the D.C. magnetic field 18 is opposite to that indicated in FIGURE 2 by the arrow, since, directions of the magnetic fluxes produced by the secondary currents are still the same as indicated by the arrows, the induced voltage in the secondary winding 21 is higher than that in the other secondary winding 31, and it follows that the D.C. voltage at the terminal 24 is higher than that at the terminal 34. This facilitates detection of the direction of the D.C. magnetic field 18. On the other hand, since, in response to the variation of the magnitude of the D.C. magnetic field 18, the difference or ratio between the output voltages at the terminals 24 and 35 varies in a similar manner, it is also possible to measure the magnitude of the D.C. magnetic field. In addition, zero-method measurement of the magnetic field is possible by applying a magnetic field of approximately the same amount and of the opposite direction to the magnetic field to be measured, in the form of separate excitation or negative feed back.

The invention is thus characterized in that it makes the detection of a D.C. magnetic flux possible by converting the flux directly into D.C. voltage or current by means of a simple apparatus. Even if there exist certain fluctuations in the A.C. supply voltage, the D.C. output voltage is maintained at zero so long as the D.C. magnetic field is zero, because the magnetic flux oscillates to the plus and minus sides in the magnetic paths 14 and 15 by the same amount. Consequently, results of detection are free from errors due to any variation in supply voltage. Furthermore, possibilities of errors due to temperature change are practically zero inasmuch as both magnetic paths 14 and 15 are located very close to each other, and any influence of a change in ambient temperatures applies evenly to both of them. Also, instead of ordinary alternating current of constant amplitude, alternating currents having suitably modulated amplitudes may be used as power supply 12. In this case, zero-drift due to residual magnetism can be eliminated very effectively if the amplitude of the alternating current is modulated in such a way that it approximates periodically to zero.

As an example, the detecting apparatus can be made according to the following specifications: Dimensions of the ferrite core 0.5 mm. in thickness, 40 mm. in length and 4 mm. in width, respectively, size of core opening 3 mm. in diameter at the center. Alternating current can be supplied by a transistor oscillator, whose oscillating frequency is 1–2 megacycles per second. Output voltage of this apparatus is approximately 0.2 volt for the measured D.C. magnetic field of 100 gauss.

We claim:
1. Apparatus for detecting the presence, magnitude and direction of D.C. magnetic fields, comprising an elongated magnetic core in the field to be measured, said core having a central hole to provide around it two magnetically saturable paths of restricted cross section, a primary winding provided on said core surrounding the whole cross sectional area of the core, means for applying an alternating current to said primary winding, secondary windings wound respectively about said magnetic paths of restricted cross section, rectifiers connected respectively in circuit with each of said secondary windings, said rectifiers being so poled that rectified currents induced in said secondary circuits by said alternating current produce magnetic fluxes of opposite directions lengthwise of said core to circulate in the same sense around said central hole of the core, and means for detecting the difference between the induced D.C. voltages in said two secondary windings, variations in said field serving to vary said induced voltages.

2. Apparatus for detecting the presence, magnitude and direction of D.C. magnetic fields, comprising an elongated magnetic core of generally bar shape in the field to be measured, said magnetic core having a centrally located hole therein to provide around it two magnetically saturable paths of restricted cross-section, said paths being located respectively between the periphery of said hole and the opposite long sides of said bar core, a primary winding provided on said bar core and which surrounds the entire cross-sectional area thereof, means for supplying an alternating current to said primary winding, secondary windings wound respectively about said magnetic paths of restricted cross-section, rectifiers connected respectively in circuit with each of said secondary windings, said rectifiers being so poled that rectified currents induced in said secondary circuits by said alternating current produce magnetic fluxes of opposite directions lengthwise of said bar core to circulate in the same sense around said central hole of the bar core, and means for detecting the difference between the induced D.C. voltages in said two secondary windings, variations in said field serving to vary said induced voltages.

3. Apparatus as defined in claim 2 for detecting D.C. magnetic fields wherein said bar core has a rectangular cross-section and the opening in said bar core is circular.

4. Apparatus as defined in claim 2 for detecting D.C. magnetic fields wherein said primary winding is composed of two sections surrounding said bar core in spaced relation and wherein said opening is located intermediate said primary winding sections.

References Cited by the Examiner

UNITED STATES PATENTS

| | | | |
|---|---|---|---|
| 2,047,609 | 7/1936 | Antranikian | 324—43 X |
| 2,252,059 | 8/1941 | Barth | 324—43 |
| 2,360,851 | 10/1944 | Curry | 324—43 X |
| 2,390,051 | 12/1945 | Barth | 324—43 |
| 2,695,384 | 11/1954 | Stuart | 324—43 |
| 2,870,267 | 1/1959 | Duinker | 179—100.2 |
| 3,040,247 | 6/1962 | Van Allen | 324—43 |

WALTER L. CARLSON, *Primary Examiner.*
FREDERICK M. STRADER, *Examiner.*